(12) United States Patent
Di Muro

(10) Patent No.: US 8,508,842 B2
(45) Date of Patent: Aug. 13, 2013

(54) OPTICAL SIGNAL AMPLIFIER, METHOD OF OPTICAL AMPLIFICATION AND OPTICAL NETWORK

(75) Inventor: Rodolfo Di Muro, Coventry West Midlands (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 696 days.

(21) Appl. No.: 12/595,512

(22) PCT Filed: Apr. 13, 2007

(86) PCT No.: PCT/EP2007/053636
§ 371 (c)(1),
(2), (4) Date: Jan. 18, 2010

(87) PCT Pub. No.: WO2008/125142
PCT Pub. Date: Oct. 23, 2008

(65) Prior Publication Data
US 2010/0195192 A1 Aug. 5, 2010

(51) Int. Cl.
*H04B 10/17* (2011.01)
*H04B 10/12* (2011.01)

(52) U.S. Cl.
USPC .......... 359/337.21; 359/337.1; 359/337.4; 359/341.1; 359/349

(58) Field of Classification Search
USPC ............. 359/337.1, 337.21, 337.4, 341.1, 359/349
See application file for complete search history.

(56) References Cited

U.S. PATENT DOCUMENTS

| | | | | |
|---|---|---|---|---|
| 5,701,194 A | * | 12/1997 | Meli et al. | 359/341.1 |
| 5,872,650 A | * | 2/1999 | Lee et al. | 359/337.13 |
| 6,049,417 A | * | 4/2000 | Srivastava et al. | 359/337.4 |
| 6,175,436 B1 | * | 1/2001 | Jackel | 359/349 |
| 6,583,924 B2 | * | 6/2003 | Masuda et al. | 359/337.2 |
| 7,019,894 B1 | * | 3/2006 | Stentz et al. | 359/341.41 |
| 7,054,061 B2 | * | 5/2006 | Arbore et al. | 359/341.1 |
| 2003/0081892 A1 | * | 5/2003 | Ghera et al. | 385/27 |
| 2003/0123132 A1 | * | 7/2003 | Hu et al. | 359/333 |
| 2003/0123136 A1 | * | 7/2003 | Lee | 359/341.1 |
| 2003/0161030 A1 | * | 8/2003 | Oh et al. | 359/334 |
| 2003/0169484 A1 | * | 9/2003 | Arbore et al. | 359/341.1 |
| 2003/0223104 A1 | * | 12/2003 | Kinoshita et al. | 359/333 |
| 2006/0227412 A1 | * | 10/2006 | Ghiggino et al. | 359/337 |
| 2007/0064305 A1 | * | 3/2007 | Bogoni et al. | 359/341.41 |
| 2008/0131121 A1 | * | 6/2008 | Magri et al. | 398/59 |

FOREIGN PATENT DOCUMENTS

| | | |
|---|---|---|
| EP | 0 695 050 A | 1/1996 |
| JP | 8195734 A | 7/1996 |
| JP | 10135544 A | 5/1998 |
| JP | 2001-053681 A | 2/2001 |
| JP | 2001-068772 A | 3/2001 |

(Continued)

OTHER PUBLICATIONS

PCT International Search Report, mailed Feb. 1, 2008, in connection with International Application No. PCT/EP2007/053636.

(Continued)

*Primary Examiner* — Eric Bolda
(74) *Attorney, Agent, or Firm* — Potomac Patent Group PLLC

(57) ABSTRACT

An optical signal amplifier for use in optical networks operating in a ring configuration comprising a first doped optical fiber loop pumped by a first laser and a second optical fiber loop pumped by a second laser.

22 Claims, 6 Drawing Sheets

(56) References Cited

FOREIGN PATENT DOCUMENTS

| | | |
|---|---|---|
| JP | 2001-102666 A | 4/2001 |
| JP | 2003-318468 A | 11/2003 |
| JP | 2007-505538 A | 3/2007 |
| JP | 2007-513510 A | 5/2007 |
| JP | 2007-526702 A | 9/2007 |
| WO | 2004/064280 A | 7/2004 |
| WO | 2005/025096 A | 3/2005 |
| WO | 2005/055476 A | 6/2005 |
| WO | WO 2005055476 A1 * | 6/2005 |

OTHER PUBLICATIONS

Japanese Office Action, mailed Mar. 9, 2012, in connection with counterpart Japanese Patent Application No. 2010-502425.
Foreign Associate provided translation of Japanese Office Action, dated Mar. 9, 2012, in connection with counterpart Japanese Patent Application No. 2010-502425.

* cited by examiner

OPTICAL SIGNAL AMPLIFIER, METHOD OF OPTICAL AMPLIFICATION AND OPTICAL NETWORK

FIELD OF THE INVENTION

The present invention relates to optical transmission network, in general, and in particular to an optical amplifier for use in an optical telecommunications network with Amplified Spontaneous Emission (ASE) recirculation and a method of operating said optical amplifier.

BACKGROUND OF THE INVENTION

An ongoing challenge in the optical networks industry is to maximize the data transmission capacity of a single fibre. The introduction of multiple channels through Wavelength Division Multiplexing (DWDM) systems has greatly improved this capacity, as has the steady improvement of the data bit rate on a single channel As a result, there are now three alternative paths to follow for increasing overall data transmission, namely increasing the single channel bit rate, reducing the channel spacing or increasing the optical bandwidth.

In an optical looped network the optical signals are added and dropped at the network nodes and then the dropped signals are further transmitted in different part of the network e.g. towards subscriber. The added signals, in turn, are multiplexed with the signals in the looped part of the optical network. The distances between the nodes of the network are long enough to attenuate the optical signals in addition to the attenuation experienced at the add/drop multiplexers and other passive parts of the network. To compensate this attenuation the optical signals are amplified.

One of the main problems to be faced when designing amplified optical rings in closed form for use with WDM applications is recirculation of Amplified Spontaneous Emissions (ASEs) produced by each amplifier, usually of the rare earth doped fibre type, for example, especially an Erbium-Doped Fibre Amplifier (EDFA).

WDM ring structures usually employ filters for adding or extracting specific channels from the optical line. In many cases to compensate for losses in the fibres or filters one or more optical amplifiers are necessary along the ring.

The noise produced by these amplifiers outside the band allocated for the channels can recirculate in the ring if not controlled. If overall gain on the network ring is more than one, i.e. total gain is greater than total losses as may happen if some amplifier amplifies more than the attenuation of the preceding section, the ASE noise could be amplified as a signal and grow indiscriminately in the ring because of recirculation, making it difficult to control the ring status and ensure survival of the traffic channels.

The known ways of solving the problem include introducing an interruption along the ASE noise path at some point on the ring. Wavelength blocker enables to remove the residual noise and noise generated out of the bandwidth. In this manner the problem is solved with the disadvantage of having to introduce additional passive components and/or with the loss of flexibility in the system. Centralized traffic is necessary or any traffic reconfiguration requires the visit of the node which realizes the ASE interruption.

In the second approach each the amplifiers installed in the optical ring (loop) requires rather expensive Power Monitoring Unit. This approach tends to force the network ring gain to keep it below the lasing threshold so that the ASE recirculation cannot increase in power while propagating along the ring. A problem with this approach is that EDFA or similar amplifiers have gain which depends on the power applied at input and in the power grid the power input to the amplifiers depends in turn on the number of channels active at that time. For this reason, in order to keep total gain beneath the lasing threshold under all possible conditions, including the addition or removal of channels and nodes, a complex global control algorithm of the ring with many monitoring points is needed or else it is necessary to hold the gain of the individual amplifiers low enough to ensure that even under conditions leading to the highest gain of the amplifiers the total gain in the network is less than 1. But this solution involves a considerable reduction in the overall performance achievable since when far from the highest gain conditions amplification of the individual amplifiers is much lower that that which could be realized.

In another known solution, disclosed in WO2004/064280, for a looped optical transmission system with rare earth doped fibre optical amplifiers (e.g. EDFA) a gain control is achieved by positioning a gain peak at a wavelength ($\lambda_{ASE}$) outside the band ($\lambda_1$-$\lambda_N$) of the channels transmitted along the ring. This gain peak at $\lambda_{ASE}$ corresponds to an ASE emission peak of the amplifiers in the ring and the method employs the lasing peak produced in this way as a gain stabilization signal. Recirculation of the ASE noise is subject to peak gain effects which produce a peak lasing at $\lambda_{ASE}$ (as stated, outside the band $\lambda_1$-$\lambda_n$ reserved for the channels). This peak lasing, usually considered harmful in other systems, can be used as a signal for stabilizing the gain of all the amplifiers in the ring, hence achieving a ring with blocked gain with the stabilization signal, which is not inside a particular individual amplifier but is common to all the amplifiers in the ring. In this solution all the amplifiers of the ring are controlled and stabilized by increase and control of the ASE noise lasing peak.

A disadvantage of the solutions known in the art is that the ASE peak covers part of the spectrum that could be successfully used for transmission channels (i.e. part of the spectrum between 1530 nm and 1560 nm). At present the $\lambda_1$-$\lambda_n$ range is enough to accommodate less than 32 channels that are spaced by 100 GHz as provided by the ITU recommendation.

Hence, an improved optical amplifier would be advantageous and in particular one that can transmit more communication channels in wider spectrum without use of expensive Power Monitoring Units.

SUMMARY OF THE INVENTION

Accordingly, the invention seeks to preferably mitigate, alleviate or eliminate one or more of the disadvantages mentioned above singly or in any combination.

According to a first aspect of the present invention there is provided an optical signal amplifier for use in optical networks operating in a ring configuration comprising a first doped optical fibre loop pumped by a first laser, a first gain flattening filter, an optical splitter for splitting signal after the first gain flattening filter, a second optical fibre loop connected to one output port of the splitter, said second optical fibre loop being pumped by a second laser, a second filter and an optical coupler for combining output of the second filter and the signal from the second output port of the optical splitter.

According to a second aspect of the present invention there is provided a method of gain control in an optical network operating in a ring configuration comprising pumping by a first laser a first doped optical fibre loop to create a gain peak at a first wavelength, corresponding to an Amplified Spontaneous Emission peak of the first doped optical fibre loop; filtering the signal from the first doped optical fibre loop with a first gain flattening filter; splitting the signal after the first gain flattening filter; pumping by a second laser a second optical fibre loop to create a gain peak at a second wavelength, corresponding to an Amplified Spontaneous Emission peak of the second optical fibre loop, wherein said second wavelength is shortened compared to said first wavelength and the second wavelength is outside the band of the channels along the ringed network, wherein the peak at the second wavelength acts as a gain stabilisation signal; filtering the signal from the second optical fibre loop with a second filter; and combining output of the second filter and the signal from the second output port of the optical splitter.

According to a third aspect of the present invention there is provided an optical network operating in a ring configuration comprising an optical signal amplifier comprising a first doped optical fibre loop pumped by a first laser, a first gain flattening filter, an optical splitter for splitting signal after the first gain flattening filter, a second optical fibre loop connected to one output port of the splitter, said second optical fibre loop being pumped by a second laser, a second filter and an optical coupler for combining output of the second filter and the signal from the second output port of the optical splitter.

Further features of the present invention are as claimed in the dependent claims.

The present invention beneficially allows for enabling optimized metro configurations that provide self-stabilisation and removing gain variations when channels are added or dropped. Network design, installation and maintenance are simplified, while no manual intervention is required to stabilize the ring system after repair in case of fibre breaks.

BRIEF DESCRIPTION OF THE DRAWINGS

The present invention will be understood and appreciated more fully from the following detailed description taken in conjunction with the drawings in which.

DESCRIPTION OF EMBODIMENTS OF THE INVENTION

For the sake of clarity the drawings present embodiments the invention in a very schematic way with elements and lines not essential for understanding the invention omitted.

Figure 1:
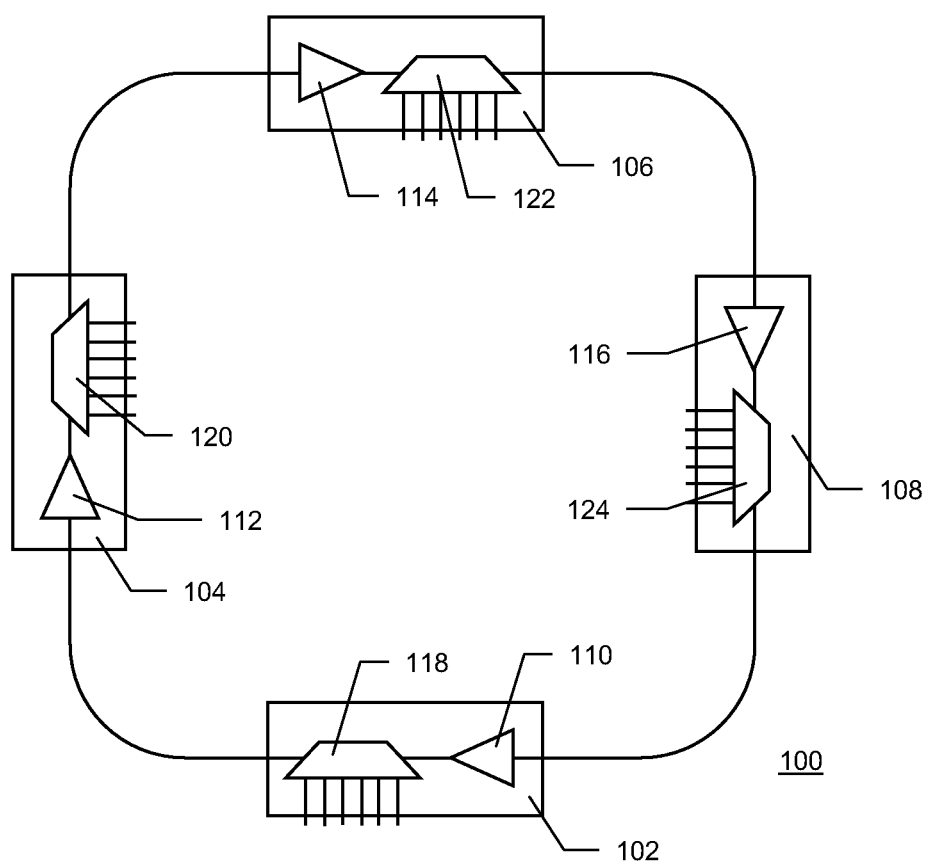
FIG. 1 is a diagram illustrating an optical network operating in a ring configuration in one embodiment of the present invention.

With reference to FIG. 1 an optical network 100 operating in a ring configuration is presented. Elements 102-108 are known as nodes of the network 100. These nodes are used for connecting local traffic by adding and/or dropping channels. In one embodiment the elements 118-124 are add/drop multiplexers, but other devices can also be used. Because the distance between the neighbouring nodes is measured in tens of kilometres the signal circulating in the optical fibre is attenuated. Additionally the equipment in the nodes also attenuates the signal. In order to efficiently transmit traffic along the network it is necessary to amplify the optical signals.

The present invention provides a solution for an optical signal amplifier that can be used in optical networks operating in ring configuration and the amplifier according to the present invention provides amplified signal in a broad spectrum without use of Power Monitoring Units. The present invention uses a peak corresponding to an Amplified Spontaneous Emission that is formed outside the spectrum used by the channels along the fibre in the ringed network 100 as a gain stabilisation signal. In order to transmit more channels in a way compliant with the ITU recommendations it is necessary to use the spectrum (or at least part of it) used in the prior art solutions by the ASE peak, or generate an extended spectrum.

The description of embodiments given below, unless stated otherwise, assumes that the first optical fibre loop, 202, of the first amplification stage is doped with erbium (EDF—Erbium Doped Fibre) and the second optical fibre loop, 210, of the second amplification stage is a segmented clad fibre. FIGS. 3A to 3E illustrate characteristics of this configuration.

Figure 2:
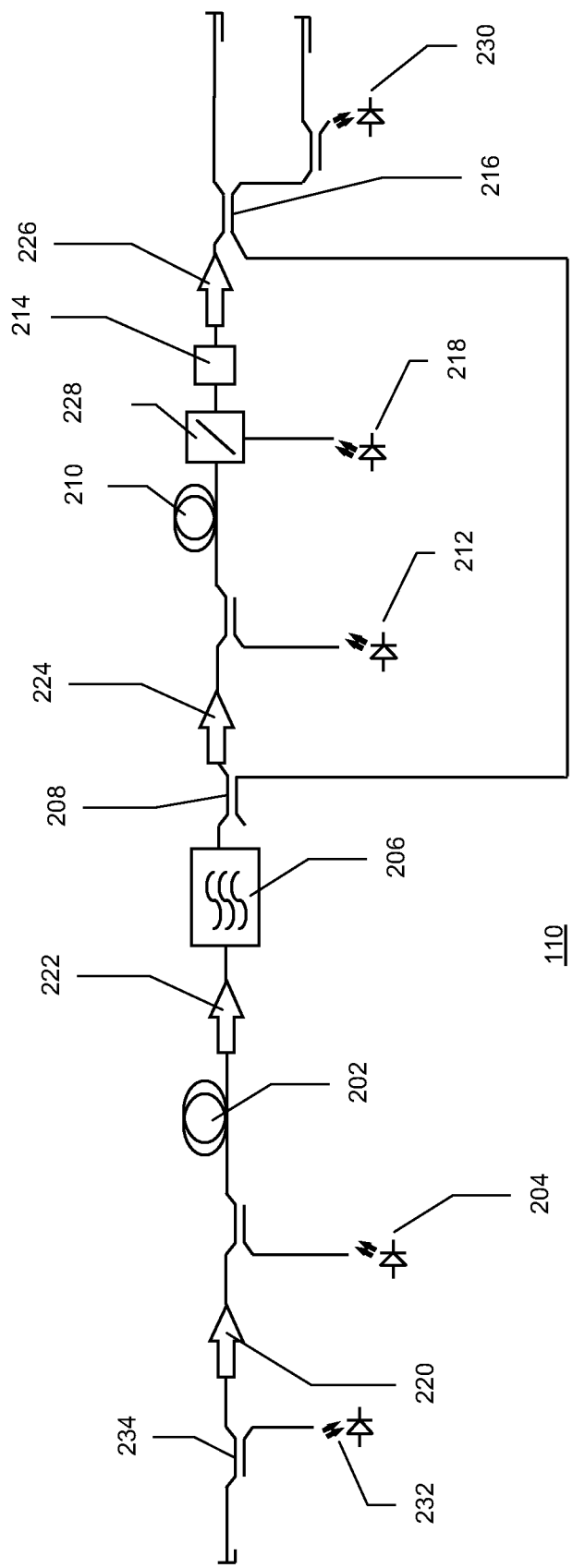
FIG. 2 is a diagram illustrating an optical signal amplifier in one embodiment of the present invention.
Figure 3A:
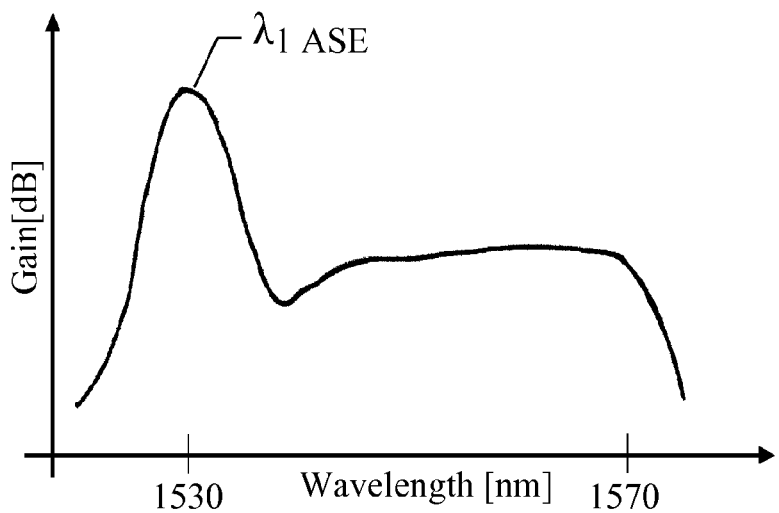
FIG. 3A is a spectrum of the optical signal at the output of the first loop of the optical amplifier in one embodiment of the present invention (first loop: erbium doped, second loop: segmented clad fibre)

With reference to FIG. 2 an optical signal amplifier, 110, in one embodiment of the present invention is shown. The amplifier 110 comprises a first doped optical fibre loop 202, which is pumped by a first laser 204. In a preferred embodiment the first laser 204 operates at 980 nm wavelength in co-pumping configuration. Co-pumping means that the light from the first laser enters the fibre in the same direction as the light that travels in the fibre. The introduction of a pumping light generated by the first laser 204 forms a first stage of the amplifier 110 and also is responsible for creation of a gain peak at a first wavelength, $\lambda_{1\ ASE} \approx 1530$ nm, corresponding to an Amplified Spontaneous Emission peak of the first doped optical fibre loop 202 as illustrated in FIG. 3A.

In a preferred embodiment the first doped optical fibre loop is silica fibre based or tellurite fibre based and is doped with erbium (EDF—Erbium Doped Fibre).

Figure 3B:
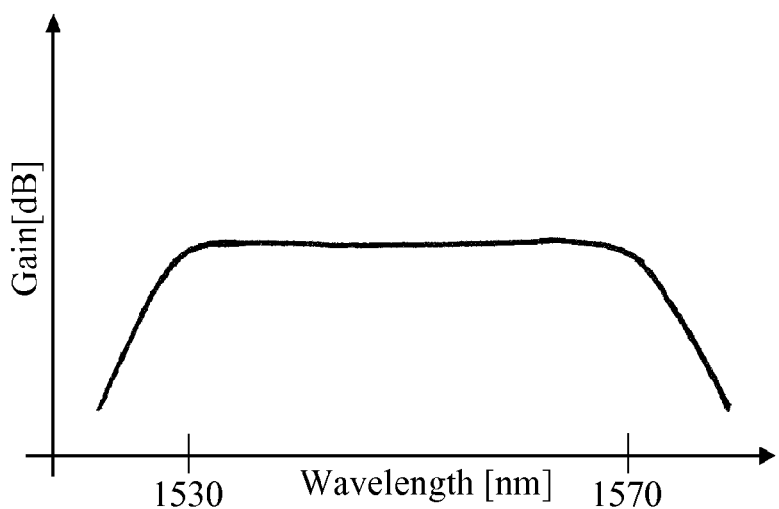
FIG. 3B is a spectrum of the optical signal at the output of the first gain flattening filter of the optical amplifier in one embodiment of the present invention (first loop: erbium doped, second loop: segmented clad fibre)

Since this gain peak takes a substantial part of the spectrum designated for the transmission channels (i.e. approximately from 1530 nm to 1560 nm) the output of the first stage of the amplifier or the first doped optical fibre loop 202 is connected to a first gain flattening filter 206. After traversing the first gain flattening filter 206 the peak at 1530 nm is removed and the resulting spectrum is characterised by a broad plateau between approximately 1530 nm and 1560 nm as is illustrated in FIG. 3B. This, however, cannot be used for recirculating ring amplification of the optical signals as it lacks the peak that can be used as a gain stabilisation signal. At the output of the first gain flattening filter 206 is connected an optical splitter 208. The optical splitter takes a part of the signal and connects it, via its first output port, to a second optical fibre loop 210. Said second optical fibre loop 210 is pumped by a second laser 212.

In a preferred embodiment the second laser 212 operates at 980 nm wavelength in co-pumping configuration.

Figure 3C:
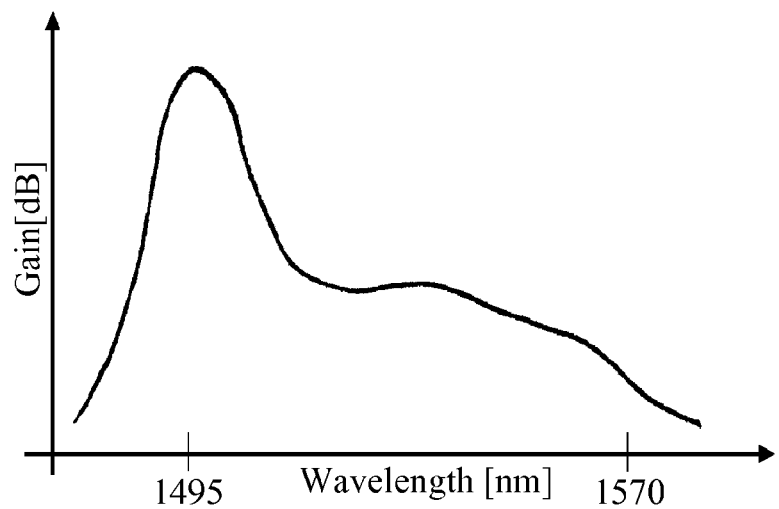
FIG. 3C is a spectrum of the optical signal at the output of the second loop of the optical amplifier in one embodiment of the present invention (first loop: erbium doped, second loop: segmented clad fibre)

In a preferred embodiment the second optical fibre loop 210 is a segmented clad fibre. This different material, as a result of the pumping, creates a gain peak at a second wavelength, $\lambda_{2\ ASE} \approx 1495$ nm, corresponding to an Amplified Spontaneous Emission peak of the second optical fibre loop 210 as illustrated in FIG. 3C. Due to the use of different material in the second loop 210, the resulting ASE gain peak is shifted towards shorter wavelengths.

It must be noted that the references to the first wavelength, $\lambda_{1\ ASE} \approx 1530$ nm, and the second wavelength, $\lambda_{2\ ASE} \approx 1495$ nm, also cover the bandwidth surrounding the centre of the ASE peaks.

Figure 3D:
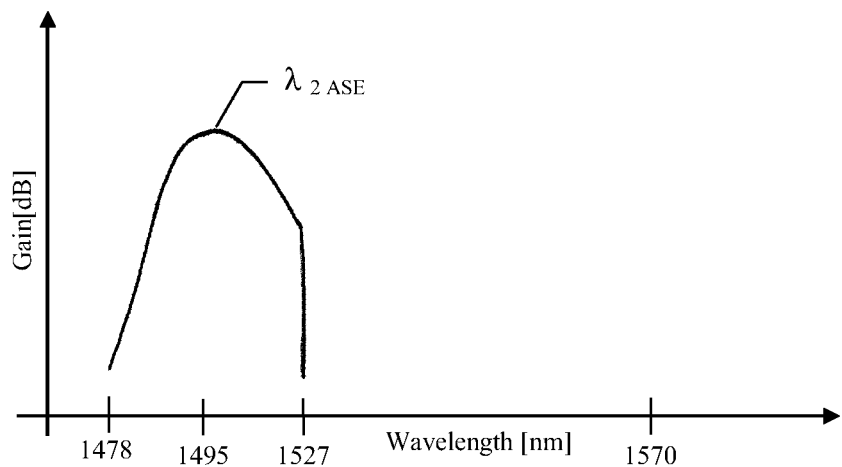
FIG. 3D is a spectrum of the optical signal at the output of the band-pass filter of the optical amplifier in one embodiment of the present invention (first loop: erbium doped, second loop: segmented clad fibre)
Figure 3E:
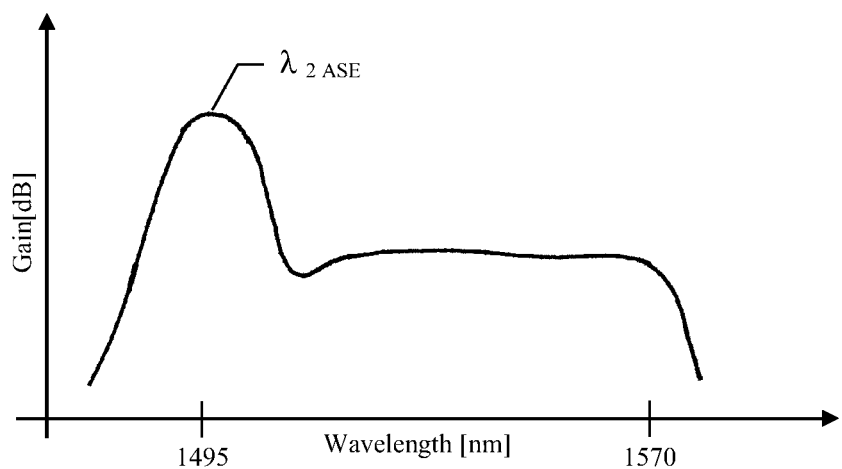
FIG. 3E is a spectrum of the optical signal at the output of the optical coupler of the optical amplifier in one embodiment of the present invention (first loop: erbium doped, second loop: segmented clad fibre)

The output of the second optical fibre loop 210 is connected to a band-pass filter 214. In the embodiment with clad fibre the role of the band-pass filter 214 is to pass only the ASE gain peak at $\lambda_{2\ ASE} \approx 1495$ nm with the bandwidth surrounding the centre of the ASE peak and to block signals with wavelength above and below a predefined value. The ASE peak is used as a gain stabilisation signal. In a preferred embodiment the band-pass filter 214 lets through signals with wavelength approximately from 1478 nm to 1527 nm as it is illustrated in FIG. 3D. An optical coupler 216 has a first input port connected to the output of the band-pass filter 214 and a second input port connected to a second output port of the optical splitter 208. The coupler 216 combines the signal output from the band-pass filter 214 and the signal from the second output port of the optical splitter 208. The resulting spectrum is illustrated in FIG. 3E. The spectrum of FIG. 3E shows a distinctive peak at approximately 1495 nm that is used as a gain stabilisation signal and a broad plateau between 1530 nm and 1560 nm that is used for amplifying optical signals organised in 40 channels spaced by 100 GHz, however different spacing of channels, if required, can also be used.

In one embodiment the optical signal amplifier 110 comprises a third laser (not shown) for counter-pumping the first doped optical fibre loop 202. Counter-pumping means that the light from the third laser enters the fibre in the opposite direction as the light that travels in the fibre.

In another embodiment the optical signal amplifier 110 comprises a fourth laser 218 for counter-pumping the second optical fibre loop 210. The fourth laser 218 is connected to the second optical fibre loop 210 via coupler 228, which is a 1480 nm coupler made of TFF (Thin Film Filter) drawn differently from the 980 nm coupler.

In yet another embodiment the optical signal amplifier 110 comprises the third laser and fourth laser 218 for counter-pumping the first and the second loop accordingly.

In one embodiment the third laser and the fourth laser 218 generate light of 1480 nm wavelength.

The use of only 980 nm laser in co-pumping configuration produces about 1 dB noise figure advantage compared to the use of only 1480 nm laser in counter-pumping configuration, but the 1480 nm counter-pumping results in higher output power compared to only 980 nm pumping. A configuration with 980 nm co-pumped (pump laser power in a range 120-260 mW) and 1480 nm counter-pumped (pump laser power in a range 150-230 mW) allows a low noise figure and high output power. In alternative embodiments, however, different ranges of power of the pumping lasers can be used. A 1480 nm counter-pumping increases the backtravelling ASE at erbium doped fibre input, but this is resolved by isolators described below.

In order to generate gain in the required part of the spectrum a specific length of the loops must be used. In one embodiment the length of the fibre in the first loop 202 (erbium doped) is approximately 10-15 m and the length of the fibre in the second loop, 210 (segmented clad), is approximately 5-8 m. The lengths given are for illustration of one embodiment only. The length required for generation spectrum in one or the other range depends on the characteristics of the fibre used. Therefore for one skilled in the art it is clear that also different, from the given above, lengths of the fibre can be used.

In one embodiment the amplifier 110 also comprises means for monitoring 230 the output signal of the optical coupler 216. The means for monitoring 230 is connected to the output of the optical coupler 216 via a second optical splitter (a tap point) and takes a small fraction of the signal (approx. 5%) for monitoring. In a preferred embodiment the means for monitoring 230 is a PIN diode. It is, however, within contemplation of the present invention that other devices can also be used for monitoring output signal. The amplifier 110 further comprises means for controlling (not shown) the laser pumping the first doped optical fibre loop 202 and the laser pumping the second optical fibre loop 210. In one embodiment the control means controls the height of the ASE peak by controlling the second laser 212 and the height of the plateau between 1530 nm and 1560 nm by controlling the first laser. In an alternative embodiment the control means also controls the third laser (this affects the plateau) and the fourth laser (this affects the ASE peak). By controlling the ASE peak in the second loop, 210, this is done by varying the power pumped into the second loop 210, control and stabilisation of the traffic wavelengths is achieved.

In a preferred embodiment the amplifier 110 further comprises a first isolator (220) at the input of the first loop (202). The first isolator is installed before the coupler, which couples the first laser 204 and the first loop 202. The amplifier 110 also comprises a second isolator 222 at the output of the first loop 202.

Also preferably, the amplifier 110 has a third isolator 224 at the input of the second loop 210 (i.e. before the coupler that couples the second laser 212 and the second loop 210) and a fourth isolator 226 at the output of the second loop 210. In one embodiment the fourth isolator is installed at the output of the band-pass filter 214. In alternative embodiments, however, the fourth isolator can be installed closer to the output of the second loop (e.g. directly at the output of the second loop in the case when only co-pumping of the second loop 210 is carried out).

The function of the isolators is suppressing undesired oscillations within the pumped loops 202 and 210. The first isolator 220 isolates the first loop 202 (also called first amplification stage) from the undesired input components and suppresses any back-propagation of the amplified signal towards the input. The function of the second isolator 222 is to prevent cavity oscillation caused by active material (Erbium and pump) that would be in condition of lasing and also reduce the reflection created by connectors (not shown in figure). The third 224 and fourth 226 isolators perform, accordingly, the same functions in the second loop 210 (second amplification stage).

There are known in the art single stage and dual stage isolators. Using a dual stage at input and output allows for producing a low noise at input and a high output power at the end. Dual stage isolators have low insertion loss and good isolation on backward reflection but they are more expensive than the single stage ones. Using single stage isolators would be more commercially usable (for pure cost consideration), but it is also possible to use a single stage isolator the first 220 and fourth 226 isolators and dual stage as the second 222 and third 224 isolators.

The first gain flattening filter 206 has the primary purpose to shape the gain-wavelength generated with erbium doped fibre. One common technology used is dielectric fibre that is a multiplayer dielectric film deposited on a substrate and mounted in a coaxial fibre package. In an alternative embodiment the first gain flattening filter is realised with Microelectromechanical Systems (MEMS) technology.

In FIG. 2, element 234 is a tap coupler and element 232 is a PIN diode. These elements are used to monitor the power at the input of the amplifier.

In another preferable embodiment given below it is assumed that both, the first, 202, and the second, 210, optical fibre loops of the first amplification stage and the second amplification stage are doped with erbium (EDF—Erbium Doped Fibre). FIGS. 4A to 4E illustrate characteristics of this configuration.

Figure 4A:
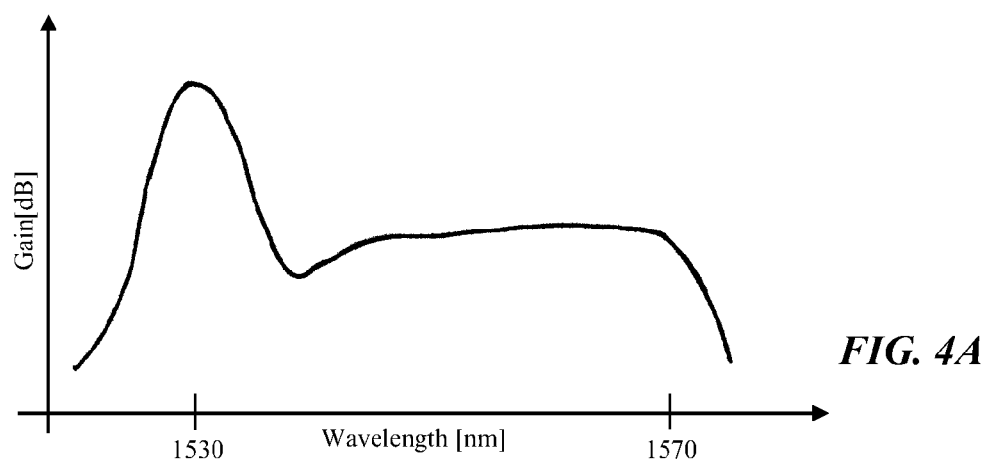
FIG. 4A is a spectrum of the optical signal at the output of the first loop of the optical amplifier in one embodiment of the present invention (first and second loops erbium doped)
Figure 4B:
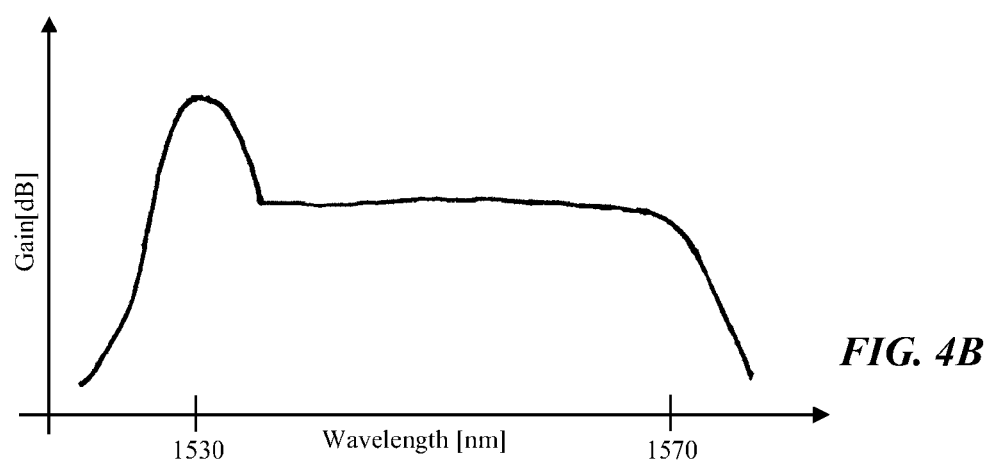
FIG. 4B is a spectrum of the optical signal at the output of the first gain flattening filter of the optical amplifier in one embodiment of the present invention (first and second loops erbium doped)
Figure 4C:
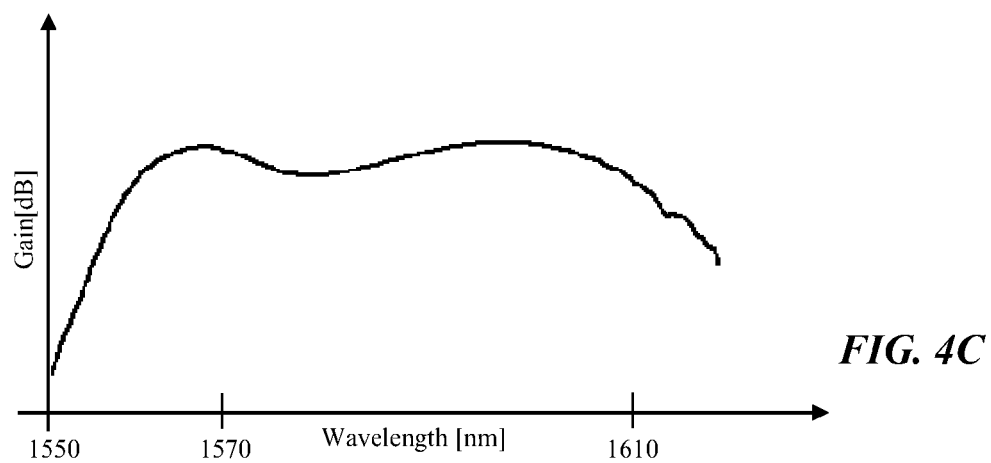
FIG. 4C is a spectrum of the optical signal at the output of the second loop of the optical amplifier in one embodiment of the present invention (first and second loops erbium doped)

In this embodiment in the optical signal amplifier 110 the first optical fibre loop 202 and the second optical fibre loop 210 are erbium doped. In the case of the two loops with erbium doped fibre the first loop 202 generates C-band spectrum from approximately 1529 nm to approximately 1560 nm as illustrated in FIG. 4A, whereas the second loop 210 generates an L-band spectrum from approximately 1570 nm to approximately 1610 nm as illustrated in FIG. 4C. In order to generate different band spectrums the length of the loops is different. In one embodiment the length of the fibre in the first loop 202 is approximately 10-15 m and the length of the fibre in the second loop, 210, is approximately 50-70 m. The lengths given are for illustration of one embodiment only as dependent on absorption peak of the Erbium doped fibre. The length required for generation spectrum in one or the other range depends on the characteristics of the fibre used. Therefore for one skilled in the art it is clear that also different, from the given above, lengths of the fibre can be used.

The configuration with two erbium doped fibre loops uses two gain flattening filters. In this embodiment the second filter 214 is a second gain flattening filter. In one embodiment the first gain flattening filter 206 needs to be tailored with a cut-off at 1537 nm with tolerance +/−2 nm. The function of the first gain flattening filter 206 is to let through the gain peak at a first wavelength, $\lambda_{1\ ASE} \approx 1530$ nm with the bandwidth surrounding the centre of this ASE peak up to approximately 1537 nm and flatten the characteristics above the 1537 nm as it is illustrated in FIG. 4B. It is within contemplation of the present invention to use different cut-off value of the wavelength from the one given above.

In a preferred embodiment the amplifier 110 has a third isolator 224 at the input of the second loop 210 (i.e. before the coupler that couples the second laser 212 and the second loop 210). One of the functions of this third isolator, in addition to the functions mentioned earlier, is that it removes any gain in the C-band generated in the first loop 202.

Figure 4D:
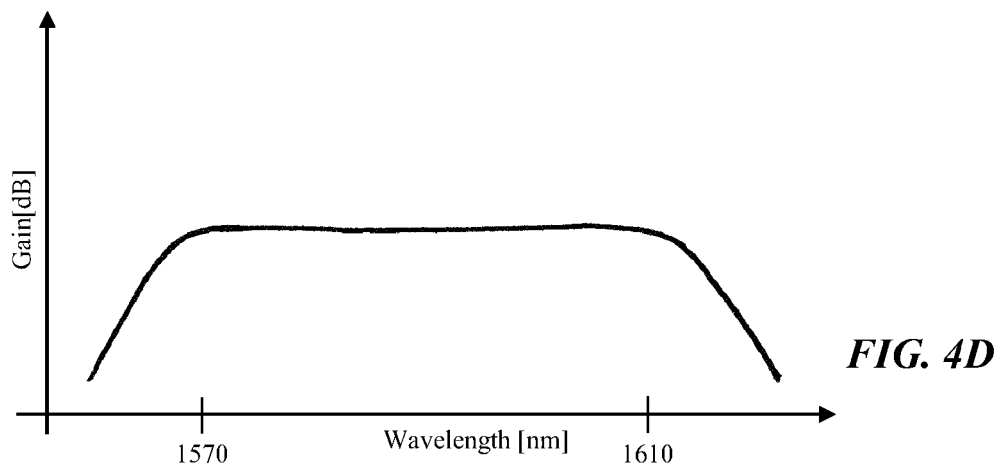
FIG. 4D is a spectrum of the optical signal at the output of the second gain flattening filter of the optical amplifier in one embodiment of the present invention (first and second loops erbium doped)

The second gain flattening filter, 214, flattens the characteristics of the whole spectrum from approximately 1570 nm to approximately 1610 nm generated in the second loop 210 as it is illustrated in FIG. 4D. The second gain flattening filter 214 can be realised in the same technologies as the first gain flattening filter 206.

Figure 4E:
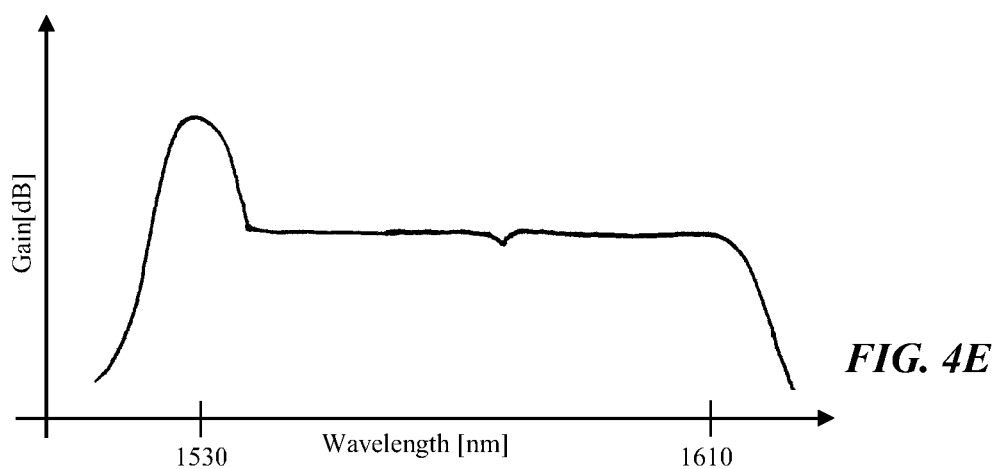
FIG. 4E is a spectrum of the optical signal at the output of the optical coupler of the optical amplifier in one embodiment of the present invention (first and second loops erbium doped).

An optical coupler 216 has a first input port connected to the output of the second gain flattening filter 214 and a second input port connected to a second output port of the optical splitter 208. The coupler 216 combines the signal output from the second gain flattening filter 214 and the signal from the second output port of the optical splitter 208. The resulting spectrum is illustrated in FIG. 4E. The spectrum of FIG. 3E shows a distinctive peak at approximately 1530 nm that is used as a gain stabilisation signal and a broad plateau between approximately 1537 nm and 1610 nm that is used for amplifying optical signals. The broad plateau between 1537 nm and 1610 nm covers the C-band and L-band and is enough to accommodate the 40 channels spaced by 100 GHz as required by the ITU recommendations.

As in the embodiment with the first loop doped with erbium and the second with segmented clad fibre also in the present embodiment with the two loops doped with erbium the amplifier 110 comprises means for controlling (not shown) the laser pumping the first doped optical fibre loop 202 and the laser pumping the second optical fibre loop 210. In one embodiment the control means controls the height of the ASE peak by controlling the first laser 204 and the flatness of the plateau in C-band by controlling the first gain flattening filter 206. The control means also controls the plateau in L-band by controlling the second laser 212. In an alternative embodiment the control means also controls the third laser (this affects the ASE peak) and the fourth laser (this affects the plateau in L-band). By controlling the ASE peak in the first loop, 202, this is done by varying the power pumped into the first loop 202, control and stabilisation of the traffic wavelengths is achieved.

Remaining elements of the amplifier 110 operates in the embodiment with two erbium doped loops operate in a similar way as in the embodiment with the first loop doped with erbium and the second loop with segmented clad fibre.

Different embodiments of the present invention with different lengths of the fibre in the first loop 202 and in the second loop 210 as well as with different pumping power of the lasers are possible. Some of these embodiments have been described above. Table 1 below summarises the values of the length of the fibre in the loops and the power of lasers used for pumping. As mentioned earlier, the values presented are for illustration only as the length required for generation spectrum in one or the other range as well as pumping power depends on the characteristics of the fibre used.

TABLE 1

| erbium - segmented clad fibre | | | | |
|---|---|---|---|---|
| | | Power 1* | Power 2** | Power 3*** |
| 1st loop length: 10-15 m | co-pumping | 120-260 mW | 120-150 mW | — |
| | counter-pumping | — | 100-180 mW | 150-230 mW |
| 2nd loop length: 5-8 m | co-pumping | 480-550 mW | 480-550 mW | — |
| | counter-pumping | — | 100-180 mW | — |
| erbium - erbium | | | | |
| | | Power 1 | Power 2 | Power 3 |
| 1st loop length: 10-15 m | co-pumping | 120-260 mW | 120-150 mW | — |
| | counter-pumping | — | 100-180 mW | 150-230 mW |
| 2nd loop length: 50-70 m | co-pumping | 120-260 mW | 120-150 mW | — |
| | counter-pumping | — | 100-180 mW | <250-300 mW |

*pumping power in single co-pumping configuration;
**pumping power in combined co-pumping and counter-pumping configuration;
***pumping power in single counter-pumping configuration.

The optical network, 100, as illustrated in one embodiment in FIG. 1 operating in a ring configuration, comprises optical amplifiers 110-116 as described above.

In one embodiment of the present invention a method of gain control in an optical network, 100, operating in a ring configuration comprises the following steps:

A first laser, 204, pumps a first doped optical fibre loop, 202, in order to create a gain peak at a first wavelength, $\lambda_{1\ ASE}$. This first wavelength corresponds to an Amplified Spontaneous Emission peak of the first doped optical fibre loop 202.

Filtering the signal from the first doped optical fibre loop, 202, with a first gain flattening filter, 206. As described above in the embodiments of the optical amplifier this can be a gain flattening filter that flattens the spectrum in its whole range for the first embodiment with the first loop 202 doped with erbium and the second loop 210 with segmented clad fibre and for the second embodiment the first gain flattening filter, 206, has a cut-off at 1537 nm with tolerance +/−2 nm. The function of the first gain flattening filter 206 is to let through the gain peak at a first wavelength, $\lambda_{1\ ASE} \approx 1530$ nm with the bandwidth surrounding the centre of this ASE peak up to approximately 1537 nm and flatten the characteristics above the 1537 nm as it is illustrated in FIG. 4B.

Splitting the signal received from the first gain flattening filter 206.

A second laser, 212, pumps a second optical fibre loop, 210, to create a gain peak at a second wavelength $\lambda_{2\ ASE}$. This gain peak corresponds to an Amplified Spontaneous Emission peak of the second optical fibre loop, 210, wherein said second wavelength $\lambda_{2\ ASE}$ is shortened compared to said first wavelength $\lambda_{1\ ASE}$ and the second wavelength $\lambda_{2\ ASE}$ is outside the band of the channels along the ringed network 100. The peak at the second wavelength $\lambda_{2\ ASE}$ acts as a gain stabilisation signal.

Filtering the signal from the second optical fibre loop, 210, with a second filter 214.

In the final step output of the second filter, 214, and the signal from the second output port of the optical splitter, 208, are combined in the combiner, 216.

Preferred and alternative embodiments of the method described are clear for a person skilled in the art from the description of the optical amplifier given above.

The invention claimed is:

1. An optical signal amplifier for use in optical networks operating in a ring configuration comprising a first doped optical fibre loop pumped by a first laser, a first gain flattening filter, an optical splitter for splitting signal after the first gain flattening filter, a second optical fibre loop connected to a first output port of the splitter, said second optical fibre loop being pumped by a second laser, a second filter and an optical coupler for combining output of the second filter with the signal from a second output port of the optical splitter, wherein the first gain flattening filter is adapted to flatten characteristics of the signal only in part of its transmission range.

2. The optical signal amplifier to claim 1 further comprising a third laser for counter-pumping the first doped optical fibre loop, wherein the first laser is adapted to co-pump the first doped optical fibre loop.

3. The optical signal amplifier according to claim 1 further comprising a fourth laser for counter-pumping the second optical fibre loop, wherein the second laser is adapted to co-pump the second optical fibre loop.

4. The optical signal amplifier according to claim 1, wherein the first optical fibre loop is erbium doped and the second optical fibre loop is a segmented clad fibre and the second filter is a band-pass filter.

5. The optical signal amplifier according to claim 1, wherein the first optical fibre loop and the second optical fibre loop are erbium doped and the second filter is a second gain flattening filter.

6. The optical signal amplifier according to claim 1 further comprising a first isolator at the input of the first loop and a second isolator at the output of the first loop.

7. A method of gain control in an optical network operating in a ring configuration comprising:
pumping by a first laser a first doped optical fibre loop to create a gain peak at a first wavelength, corresponding to an Amplified Spontaneous Emission peak of the first doped optical fibre loop;
filtering the signal from the first doped optical fibre loop with a first gain flattening filter;
splitting the signal received from the first gain flattening filter;
pumping by a second laser a second optical fibre loop to create a gain peak at a second wavelength, corresponding to an Amplified Spontaneous Emission peak of the second optical fibre loop, wherein said second wavelength is shortened compared to said first wavelength and the second wavelength is outside the band of the channels along the ringed network, wherein the peak at the second wavelength acts as a gain stabilisation signal;

filtering the signal from the second optical fibre loop with a second filter; and combining output of the second filter and the signal from the second output port of the optical splitter.

8. The method according to claim 7 further comprising counter-pumping of the first doped optical fibre loop by a third laser, wherein the first laser co-pumps the first doped optical fibre loop.

9. The method according to claim 7 further comprising counter-pumping of the second optical fibre loop by a fourth laser, wherein the second laser co-pumps the second optical fibre loop.

10. The method according to claim 7, wherein the first gain flattening filter flattens characteristics of the signal only in part of its transmission range.

11. The method according to claim 7 further comprising steps of monitoring the output signal of the optical coupler and controlling the laser pumping the first doped optical fibre loop and the laser pumping the second optical fibre loop in response to results of said step of monitoring.

12. An optical network operating in a ring configuration comprising an optical signal amplifier comprising a first doped optical fibre loop pumped by a first laser, a first gain flattening filter, an optical splitter for splitting signal received from the first gain flattening filter, a second optical fibre loop connected to a first output port of the splitter, said second optical fibre loop being pumped by a second laser, a second filter and an optical coupler for combining output of the second filter with the signal from a second output port of the optical splitter.

13. The network according to claim 12, wherein the optical signal amplifier further comprises a third laser for counter-pumping the first doped optical fibre loop, and the first laser is adapted to co-pump the first doped optical fibre loop.

14. The network according to claim 12, wherein the optical signal amplifier further comprises a fourth laser for counter-pumping the second optical fibre loop, wherein the second laser is adapted to co-pump the second optical fibre loop.

15. The network according to claim 12, wherein in the optical amplifier the first optical fibre loop is erbium doped and the second optical fibre loop is a segmented clad fibre and the second filter is a band-pass filter.

16. The network according to claim 12, wherein in the optical signal amplifier the first optical fibre loop and the second optical fibre loop are erbium doped and the second filter is a second gain flattening filter.

17. The network according to claim 12, wherein the first gain flattening filter is adapted to flatten characteristics of the signal only in part of its transmission range.

18. The network according to claim 12, wherein the optical signal amplifier further comprises a first isolator at the input of the first loop and a second isolator at the output of the first loop.

19. The network according to claim 12, wherein the optical signal amplifier further comprises a third isolator at the input of the second loop and a fourth isolator at the output of the second loop.

20. The network according to claim 12, wherein the optical signal amplifier further comprises means for monitoring the output signal of the optical coupler and means for controlling the laser pumping the first doped optical fibre loop and the laser pumping the second optical fibre loop.

21. The network according to claim 15, wherein the optical signal amplifier is adapted to control an Amplified Spontaneous Emission peak of the second optical fibre loop by controlling power pumped to said second optical fibre loop.

22. The network according to claim 16, wherein the optical signal amplifier is adapted to control an Amplified Spontaneous Emission peak of the first doped optical fibre loop by controlling power pumped to said first doped optical fibre loop.

* * * * *